(12) United States Patent
Farmer

(10) Patent No.: US 6,712,171 B2
(45) Date of Patent: Mar. 30, 2004

(54) REFUELING SAFETY SWITCH

(75) Inventor: Shalette M. Farmer, Bellefontaine, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 288 days.

(21) Appl. No.: 09/969,674

(22) Filed: Oct. 2, 2001

(65) Prior Publication Data

US 2003/0062210 A1 Apr. 3, 2003

(51) Int. Cl.⁷ ................................................ B60K 28/12
(52) U.S. Cl. ........................ 180/286; 180/271; 307/10.1
(58) Field of Search ................................. 180/286, 281, 180/271; 307/10.1, 10.6

(56) References Cited

U.S. PATENT DOCUMENTS

| 3,572,305 | A | | 3/1971 | Moragne |
| 3,878,507 | A | | 4/1975 | Medlock |
| 5,551,866 | A | | 9/1996 | Josephs et al. |
| 6,011,484 | A | * | 1/2000 | Dietl et al. ............... 340/825.1 |
| 6,112,714 | A | | 9/2000 | Brister |

* cited by examiner

*Primary Examiner*—Eric Culbreth
(74) *Attorney, Agent, or Firm*—Calfee, Halter & Griswold LLP

(57) ABSTRACT

A refueling safety system for a vehicle with a switch attached to a fuel door to prevent a vehicle's engine from functioning while the fuel door is opened and being refueled.

8 Claims, 2 Drawing Sheets

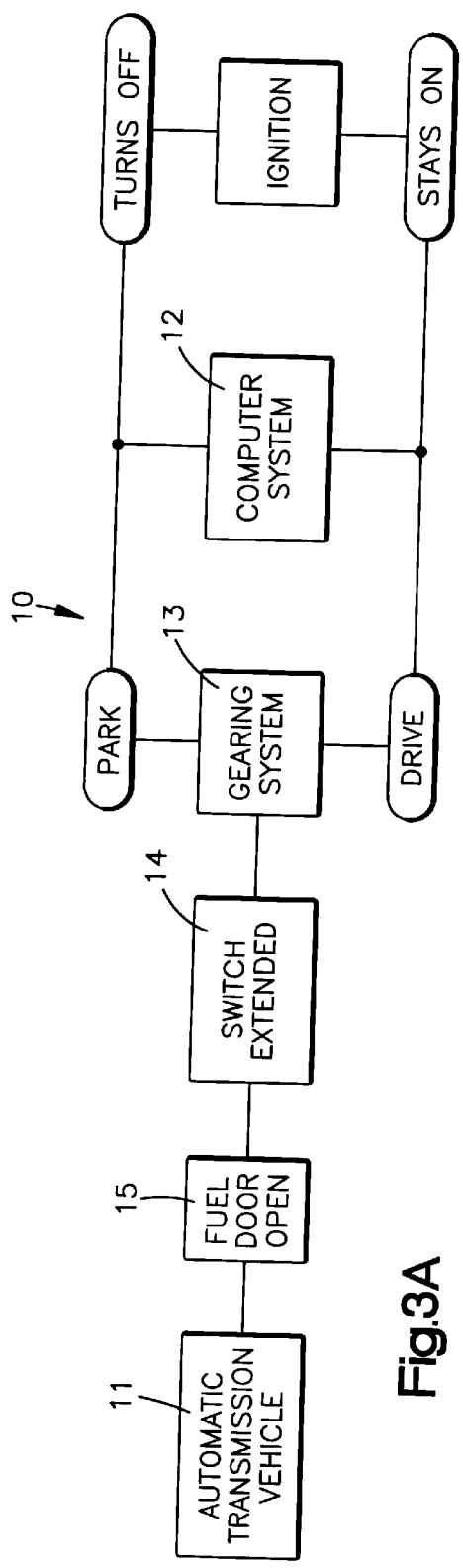
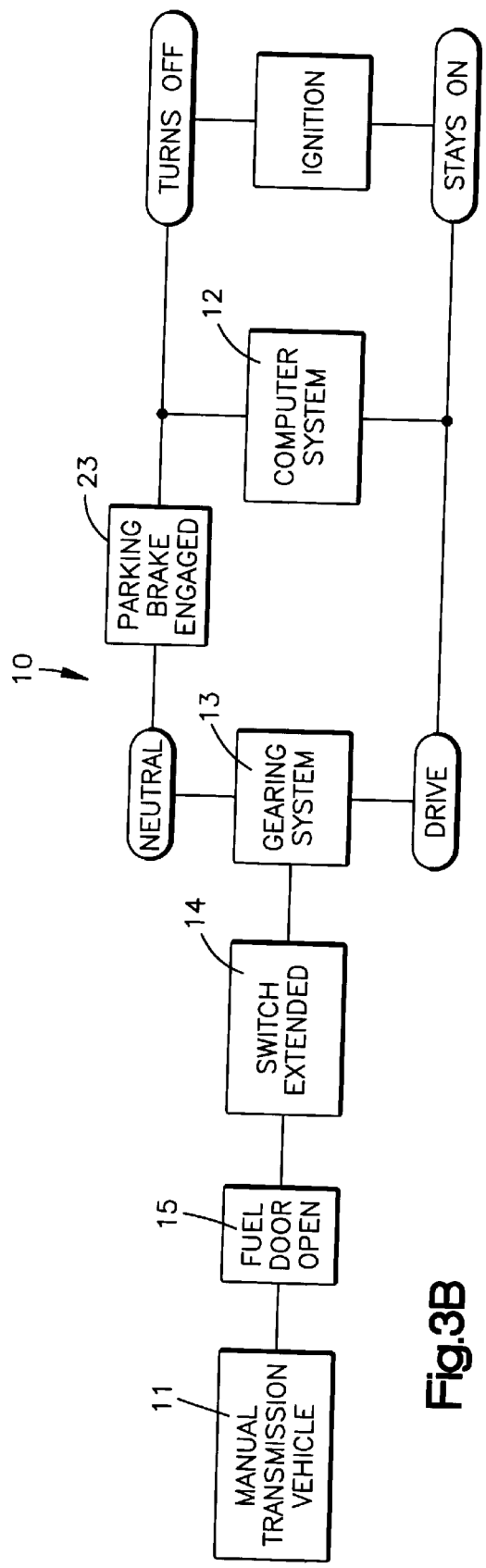

REFUELING SAFETY SWITCH

TECHNICAL FIELD

The present disclosure relates to a safety improvement for use in connection with vehicles, and more specifically, to a safety switch to prevent vehicle engine operation during refueling.

BACKGROUND OF THE INVENTION

A particular problem exists when drivers refuel their vehicles with the engines running. Some drivers may refuel with the vehicle running due to a desire to maintain the temperature inside the vehicle at a particular level, e.g., wanting to leave the heat running in the winter or to leave the air conditioning on in the summer. Substantially all fuel stations post signs on or near the fuel pumps indicating the dangers associated with refueling a vehicle during operation, and that vehicle engines should be turned off prior to fueling the vehicle. For whatever reason, these warning signs are either not noticed or are disregarded.

There are two primary problems with leaving the vehicle engine running during refueling. First, there is an increased risk of fire. The risk of fire is remote, but there is an increased possibility that a spark from the engine could start a fire by igniting gasoline fumes which are more prevalent during refueling. Second, there are environmental problems as a result of increased vehicle emissions. When the vehicle is running during refueling, it is well known that emissions are increased to an undesired level. Therefore, it is desirable to prevent a driver from running the vehicle engine while refueling.

Two patents that address safety concerns related to vehicle engine operation during refueling: U.S. Pat. Nos. 3,572,305 and 6,011,484. While these prior art patents attempt to solve the problem of preventing engine operation during refueling, these patents fail to recognize that vehicle fuel caps or fuel doors may accidentally become detached or opened while the vehicle is in motion. If the prior art patent safety systems were activated or engaged while the vehicle is in motion, vehicle engine operation would be shut down. Terminating vehicle engine operation in this unintended situation, creates a hazardous condition for the driver of the vehicle. Thus, it is important that if such safety systems are activated while the vehicle is moving, the vehicle engine should continue to run. Also, if the safety system is set up improperly or fails to operate properly, failure of any part of the safety system may cause the driver to be unable to start the vehicle.

The present device provides an improved safety system that will not allow a vehicle to be fueled while the vehicle engine is running, while at the same time providing additional safety features which will not terminate engine operation under certain conditions, such as when the vehicle is moving or the safety system is not functioning properly.

SUMMARY OF THE INVENTION

The present invention is directed to a safety system that operates to prevent vehicle engine operation during refueling.

One objective of the present invention is a refueling safety system for a vehicle with an automatic transmission system having a fuel door mounted near a fuel tank opening of the vehicle and capable of pivoting between an open position and a closed position covering the fuel tank opening. The invention also has a switch positioned adjacent the fuel door and is activated when the fuel door is opened and is deactivated when the fuel door is closed. In addition, the vehicle has a gearing system with a parking gear and a sensor capable of determining when the vehicle is in the parking gear. Also, a computer is electrically connected to both the switch and the sensor. The computer prevents the vehicle engine from functioning when the switch is activated and the vehicle is simultaneously in the parking gear.

Another objective of the present invention is a refueling safety system for a vehicle with a manual transmission system having a fuel door mounted near a fuel tank opening of the vehicle and capable of pivoting between an open position and a closed position covering the fuel tank opening. The invention also has a switch positioned adjacent the fuel door and is activated when the fuel door is opened and is deactivated when the fuel door is closed. In addition, the vehicle has a parking brake, a gearing system with a neutral gear, and a sensor capable of determining when the vehicle is in the neutral gear. Also, a computer is electrically connected to both the switch and the sensor. The computer prevents the vehicle engine from functioning when the switch is activated and the vehicle is simultaneously in the neutral gear and the parking brake is engaged.

A further objective of the present invention is a method of preventing an engine in a vehicle from functioning during refueling. When a switch has been activated, the invention determines whether an automatic transmission vehicle is in a parking gear or whether a manual transmission vehicle is in neutral and a parking gear is engaged and shuts down the engine.

The present safety system makes use of a micro-switch which is designed as a plunger. The bottom surface of the micro-switch is mounted near a latch which pivots the fuel door opened and closed. When the fuel door is in a closed position, the micro-switch is depressed. When the fuel door pivots to an open position, the plunger of the micro-switch is extended.

The micro-switch is electrically connected or wired to the vehicle computer system. The computer recognizes whether the vehicle is turned on or turned off by an electrical current. A closed electrical circuit is created when the fuel door is in the open position. Completion of the closed circuit sends a current to the computer to turn the vehicle engine off if the engine is running and in the parking gear. Also, the closed circuit will prevent the vehicle engine from being turned on while the vehicle fuel door remains in the open position. Prior to turning off the vehicle engine or ignition, the computer determines whether the vehicle is in the parking gear. If the fuel door is moved to the open position inadvertently while the vehicle is in a driving gear, the computer will recognize the state of the gear and continue to allow the vehicle to drive. Regarding manual transmission vehicles, which have no parking gear, the vehicle computer determines whether the vehicle is in one of the driving gears or the neutral gear, and only terminates the engine operation if the fuel door is in open position and the vehicle is both in neutral gear and the vehicle parking brake is engaged.

An open electrical circuit is created when the fuel door is moved to the closed position. This allows the vehicle to function when the vehicle is started.

The present safety system also incorporates an alarm feature and a malfunction check feature. If the fuel door is in an open position, an indicator light or other type of alarm alerts the driver of that fact. This will notify the driver, who may have inadvertently left the fuel door open after refueling, as to why the vehicle will not start. In addition, the vehicle computer can monitor the status of the switch circuit. If the circuit were to malfunction, the computer would save a related code that would appear during a routine diagnostics check. One possible logic set which would alert the computer to the malfunction would be if the computer were to recognize a fill-up but did not recognize the fuel door being moved to the open position at the same time. It is also noted that if the circuit were to malfunction, it would simply cause the engine shut off feature not to operate, rather than the driver being unable to start the vehicle at all.

These and other features, aspects, and advantages of the present safety system will become better understood with reference to the following description and appended claims.

BRIEF DESCRIPTION OF THE DRAWINGS

FIGS. 3A and 3B show flowcharts for operation of the safety refueling systems of the present invention.

DETAILED DESCRIPTION OF THE INVENTION

Figure 1:
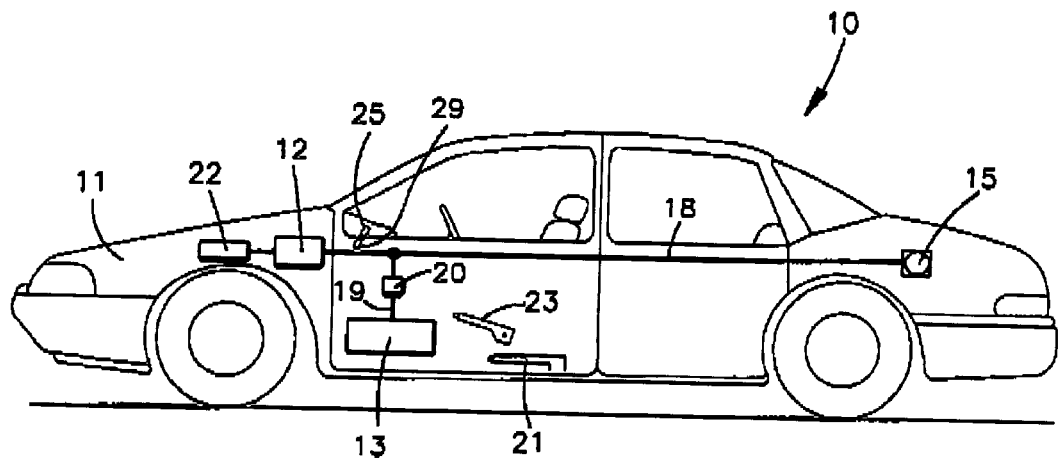
FIG. 1 shows a vehicle with the safety refueling system components of the present invention.
Figures 2A, 2B:
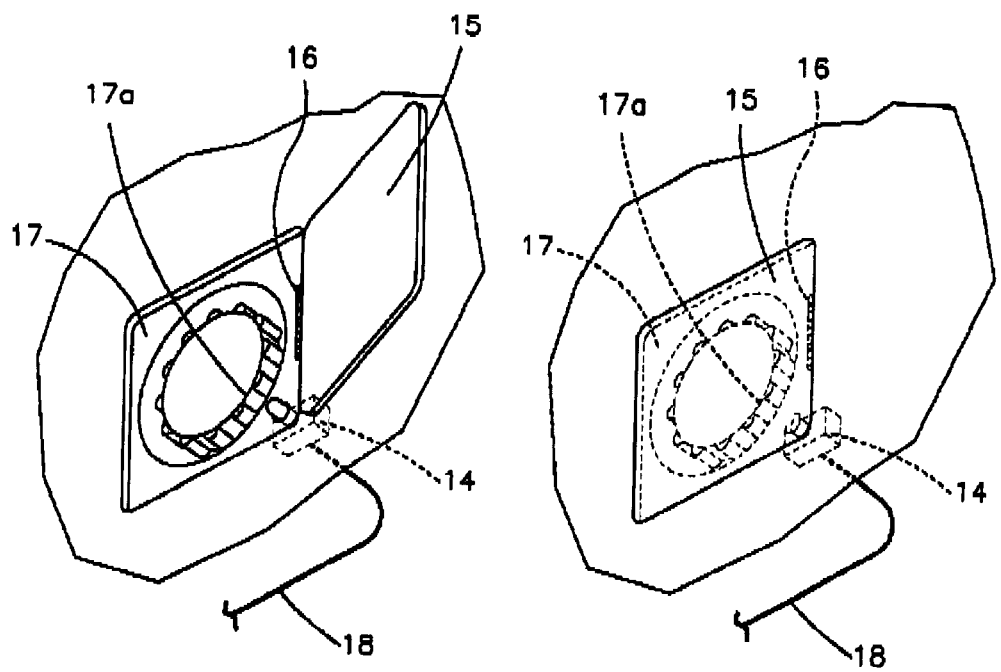
FIG. 2A shows a schematic illustration of a fuel door in the open position with the present safety refueling system.
FIG. 2B shows a schematic illustration of a fuel door in the closed position with the present safety refueling system.

As shown in FIG. 1, the refueling safety system 10 of the present application is provided in a computer system 12 of a vehicle 11 and is electrically connected to a gearing system 13 and a micro-switch or switch 14. The switch 14 is located and mounted on the vehicle 11 within a fuel door opening 17 adjacent a fuel door 15 and a fuel tank opening 17a. The fuel door 15 can pivot to an open position and a closed position via a hinge 16. A lever 21 or a similar structure inside the vehicle 11 can be manually operated to open the fuel door 15. As shown in FIG. 2A, the switch 14 is preferably a plunger type configuration which becomes depressed when the fuel door 15 is in the closed position and the switch 14 is extended when the fuel door 15 is in the open position. It should be understood that the switch 14 used in the present safety system is of a conventional design, and the switch 14 may be mounted on either the fuel door 15 itself (not illustrated) or adjacent the fuel door 15 as illustrated in FIG. 2A.

As shown in FIG. 2B, the fuel door 15 covers the fuel tank opening 17a when the fuel door 15 is in the closed position. The fuel door 15 is generally shaped for cooperative engagement covering the fuel door opening 17. The fuel door 15 is attached to the vehicle 11 at the hinge 16. The switch 14 is preferably mounted near the hinge 16 in order to make complete contact with the door 15 when it is in the closed position. The switch 14 is connected electrically via wire 18 to the computer system 12 of the vehicle. The electrical connection enables the computer system 12 to distinguish whether the fuel door 15 is opened or closed. By programming the features of the safety system or refueling safety system 10 of the present invention into the vehicle computer system 12, the electrical communications provided by the switch 14, vehicle gearing system 13 and vehicle engine 22, the safety system 10 operates to allow the vehicle engine to run or disables engine operation.

The vehicle gearing system 13 is connected electrically to the computer system 12 by an electrical wire 19. The computer or computer system 12 is thus capable of determining the status of the vehicle gearing system, and whether it is in any particular gear, such as park, drive or neutral, when the vehicle engine 22 is operating. Information regarding the status of the gearing system 13 and vehicle engine 22 are provided via sensors 20 electrically connected to the gearing system 13 and engine 22, respectively.

If the vehicle 11 has a manual transmission, the computer system 12 is also able to determine whether the vehicle 11 has a parking brake 23 engaged while the vehicle gearing system 13 is in the neutral gear.

With the present safety system 10 in place, when a driver desires to refuel the vehicle, the vehicle computer system 12 recognizes whether the vehicle engine 22 is turned on or turned off by an electrical current from a sensor 20. A closed electrical circuit is created when the fuel door 15 is in the open position, as shown in FIG. 2A. As represented schematically in FIGS. 3A and 3B, moving the fuel door to the open position operates or activates the switch 14 to create or complete the closed electrical circuit and send a current to the computer 12 to turn the vehicle engine 22 off if the engine is running and the vehicle gearing system 13 is in the parking gear. Also, the safety system 10 prevents the vehicle engine 22 from being turned on while the vehicle fuel door 15 remains in the open position.

Referring specifically to FIG. 3B, regarding manual transmission vehicles, which have no parking gear, the vehicle computer 12 determines whether the vehicle is in the driving gears or the neutral gear, and the safety system only terminates engine operation if the fuel door is in open position when the vehicle is in neutral gear and the vehicle parking brake 23 is engaged.

If the fuel door is moved to the open position inadvertently while the vehicle is in a driving gear, the computer 12 recognizes the state of the gearing system and continues to allow the vehicle to continue operation.

Once the driver has completed vehicle refueling and moves the fuel door 15 to the closed position shown in FIG. 2B, an open electrical circuit is created via the switch 14, or the switch is deactivated, which signals the safety system 10 to allow the vehicle engine 22 to be operated.

The alarm 25 and malfunction check features 29 of the present safety system are provided via conventional indicator lights or other types of audible alarms provided within the vehicle 11 to alert the driver that the fuel door 15 is in an open position or not functioning properly.

Although the present invention has been described in detail with reference to certain preferred embodiments thereof, other embodiments are possible. Therefore, the spirit and scope of the appended claims should not be limited to the description of the preferred embodiment contained herein.

What is claimed is:

1. A refueling safety system for a vehicle with an automatic transmission system comprising:
   (a) a fuel door mounted near a fuel tank opening of the vehicle and capable of pivoting between an open position and a closed position covering said fuel tank opening,
   (b) a switch positioned adjacent said door and which is activated when said door is in the open position and said switch is deactivated when said door is in the closed position,
   (c) a gearing system for a vehicle comprising a parking gear,
   (d) a sensor capable of determining whether said vehicle is in said parking gear, and (e) a computer electrically connected to both said switch and said sensor, wherein said computer prevents an engine from functioning when said computer determines that said switch is active by an electrical current and that said vehicle is simultaneously in said parking gear.

2. The refueling safety system according to claim 1 wherein said sensor is connected to said gearing system.

3. The refueling safety system according to claim 2 wherein said activated switch creates a closed electrical circuit.

4. The refueling safety system according to claim 3 wherein said deactivated switch creates en open electrical circuit.

5. The refueling safety system for a vehicle with a manual transmission system comprising:

(a) a fuel door mounted near a fuel tank opening of the vehicle and capable of pivoting between an open position and a closed position covering maid fuel tank opening, (b) a switch positioned inside said door and which is activated when said door is in the open position and said switch is deactivated when said door is in the closed position, (c) a gearing system for a vehicle comprising a neutral gear, (d) a sensor capable of determining whether said vehicle is in said neutral gear, (e) a parking brake, and (f) a computer electrically connected to both said switch and said sensor, wherein said computer prevents an engine from functioning when said computer determines that said switch is active by an electrical current and that said vehicle is simultaneously in said neutral gear and said parking brake is engaged.

6. The refueling safety system according to claim 5 wherein said sensor is connected to said gearing system.

7. The refueling safety system according to claim 6 wherein said activated switch creates a closed electrical circuit.

8. The refueling safety system according to claim 7 wherein said deactivated switch creates an open electrical circuit.

* * * * *

UNITED STATES PATENT AND TRADEMARK OFFICE
CERTIFICATE OF CORRECTION

PATENT NO. : 6,712,171 B2
DATED : March 30, 2004
INVENTOR(S) : Shalette M. Farmer It is certified that error appears in the above-identified patent and that said Letters Patent is hereby corrected as shown below:

Column 5,
Line 13, please delete "en" and insert -- an --
Line 19, please delete "maid" and insert -- said --

Signed and Sealed this

Fifth Day of April, 2005

JON W. DUDAS
*Director of the United States Patent and Trademark Office*